March 20, 1945. F. T. POWERS 2,371,843
X-RAY CASSETTE
Filed May 4, 1943 2 Sheets-Sheet 1

INVENTOR
Frank T. Powers
BY
ATTORNEYS

March 20, 1945.　　　F. T. POWERS　　　2,371,843
X-RAY CASSETTE
Filed May 4, 1943　　　2 Sheets-Sheet 2
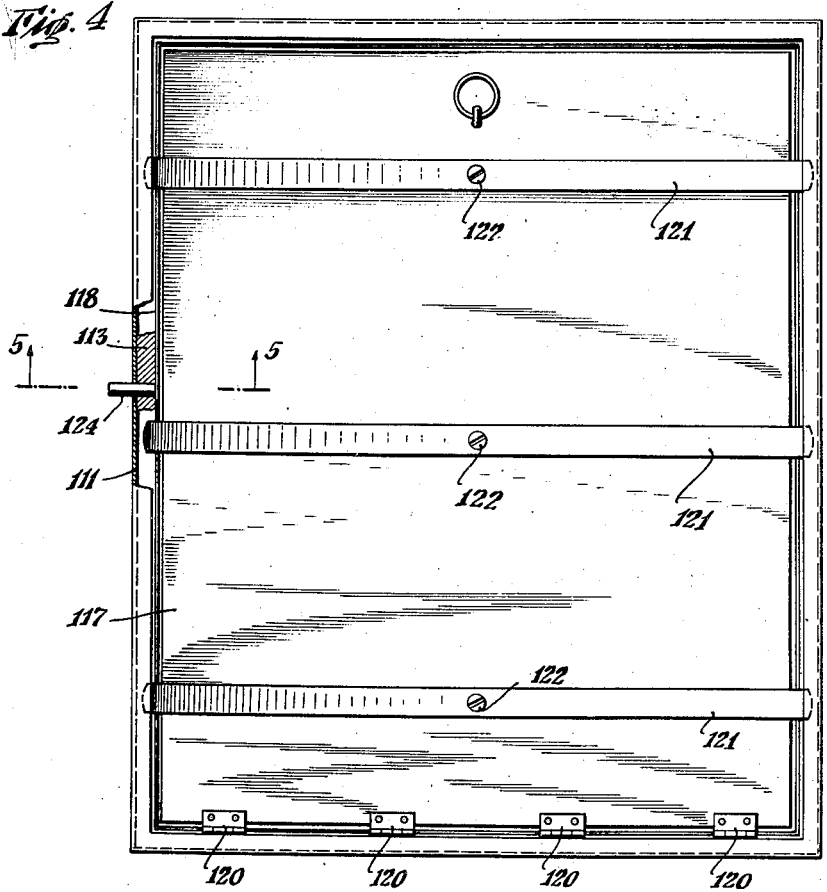
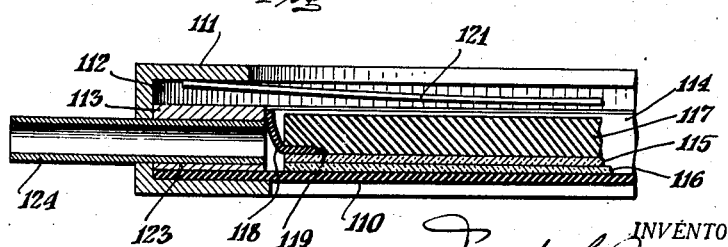
INVENTOR.
Frank T. Powers.
BY
ATTORNEYS Patented Mar. 20, 1945

2,371,843

UNITED STATES PATENT OFFICE 2,371,843

X-RAY CASSETTE

Frank T. Powers, Glen Cove, N. Y.

Application May 4, 1943, Serial No. 485,591

15 Claims. (Cl. 250—68)

The present invention relates to new and useful improvements in X-ray cassettes.

The accompanying drawings, referred to herein and constituting a part hereof, illustrate embodiments of the invention, and together with the description, serve to explain the principles of the invention.

Of the drawings:

Fig. 4 is a view in rear elevation of a modified form of cassette embodying this invention; with parts broken away better to show certain details of construction; and, Fig. 5 is a fragmentary view in section taken along the line 5—5 of Fig. 4.

The present invention has for its object the provision of a novel and improved X-ray cassette for use with X-ray sensitive material in sheet form which better insures the close, intimate and uniform contact of the sensitive material with its intensifying screen. A further object is the provision of an improved X-ray cassette in which the X-ray sensitive material is held in intimate contact with one or two intensifying screens by suction applied to the interior of the cassette. Still another object of the invention is the provision of a portable, relatively light weight cassette which insures intimate contact of the sensitive material with the intensifying screen. A flexible cassette is also provided by the invention so that, for certain special applications, the sensitive material may be held in intimate contact with the intensifying screen and the two may be curved, or otherwise flexed, to conform them to the general contour of the object X-rayed, thereby providing closer positioning of the sensitive material with respect to the object and producing sharper images.

In accordance with the illustrative embodiments of the present invention, there is provided a pair of wall members adapted to receive between them the sheet or area of sensitive material to be exposed, with one or two intensifying screens positioned in intimate contact with the sensitized surfaces of the sensitive material. The wall members, of which at least one is flexible and transparent to X-radiation, are both opaque to light and are sealingly connected at their marginal portions, so as to form an airtight suction chamber, by suitable flexible sealing means permitting access to the chamber for the purpose of inserting and removing the sensitive material and screens. A suction duct leads from the chamber for connection to a suitable suction device so that when air is educted from the chamber, the wall members will be forcibly and evenly pressed towards each other so as firmly to press the sensitive material therebetween and into intimate contact with the intensifying screen or screens.

It will be understood that the foregoing general description and the following detailed description as well are exemplary and explanatory of the invention but are not restrictive thereof.

Figure 1:
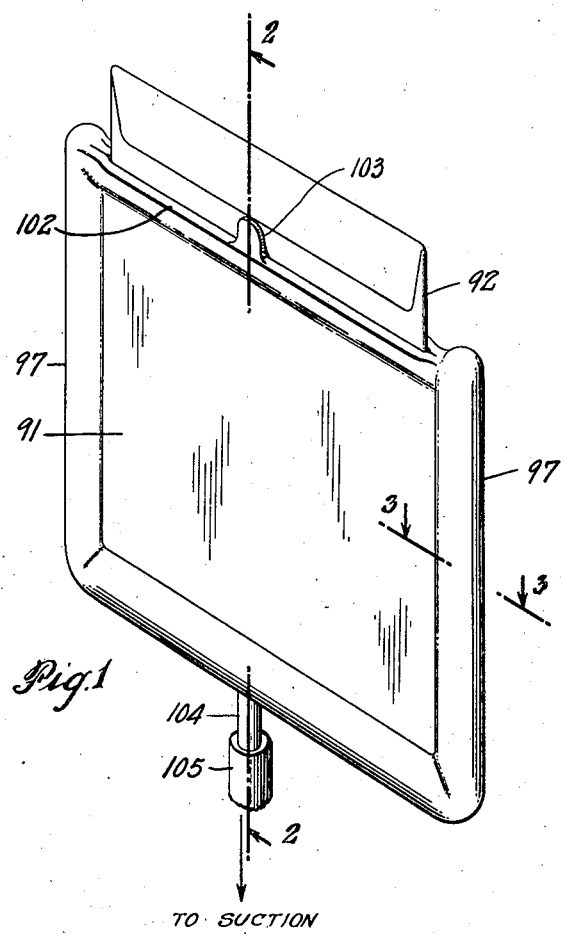
Fig. 1 is a view in perspective of a single sheet portable vacuum cassette embodying the present invention.
Figure 2:
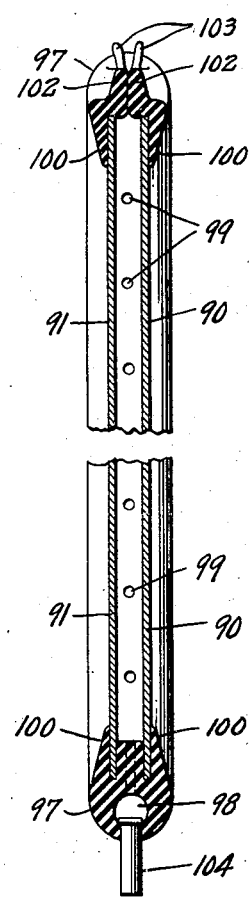
Fig. 2 is a view in section taken along the line 2—2 of Fig. 1.
Figure 3:
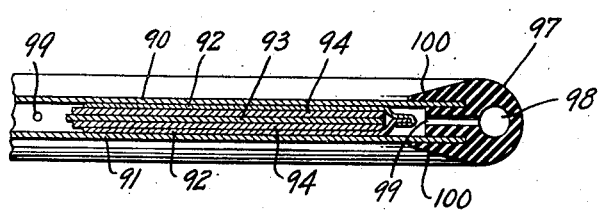
Fig. 3 is a fragmentary sectional view taken along the line 3—3 of Fig. 1.

Referring now more particularly to the accompanying drawings, there is illustrated in Figs. 1 to 3 an embodiment of the invention particularly adapted for single exposures and useful in maintaining intimate contact between the sheet of sensitive material and intensifying screens where they are to be flexed into intimate adjacency with respect to a curved object or surface to be radiographed.

As embodied, there are provided two thin flexible sheets or wall members 90, 91 of Bakelite, transparent to X-radiation, and which may be opaque to light and are somewhat larger than the sheet of sensitive material and intensifying screens to be exposed. These sheets are normally spaced a sufficient distance to receive between them a light-tight envelope 92 containing a sheet 93 of double coated X-ray film, with an intensifying screen 94 on either side of the film. The light-tight envelope permits the cassette to be loaded and unloaded in the light.

The flexible sheets 90 and 91 are normally spaced at their edges by means of a sealing strip 97 which is channeled to provide an air duct 98 having smaller apertures 99 leading to the space between the flexible sheets 90, 91. The sealing strip is also provided with fins 100 by which it may be cemented to the outer margins of the flexible sheets. Along one edge of the cassette, the sealing strip is slit to provide a long normally closed aperture across the entire width of the sheets 90, 91 so that the film envelope may be introduced into and removed from the cassette. At this slit, the sealing strip is formed with relatively wide lips 102 which normally press against each other and have tabs 103 by which they may be separated. As they normally press together, application of suction to the space between the sheets seals them more tightly and automatically.

For applying suction to the cassette, an exhaust pipe 104 is connected to the air duct 98 at some point throughout its length and may be connected to the source of vacuum by means of the flexible hose 105.

Referring now to the embodiment of the invention illustrated in Figs. 4 and 5, the vacuum cassette there shown offers the advantage of uniform and intimate contact between the sensitive material and intensifying screen, the advantage of portability and the advantage of durability under severe conditions of use.

As embodied, there is provided a thin flexible member 110 of Bakelite, transparent to X-radiation and somewhat larger than the sensitive material and intensifying screens to be exposed. The member 110 is sealed hermetically at its margin to a rigid frame 111 preferably of metal having a continuous channel 112, preferably of U-shape, within which the marginal portions of the member 110 are lodged. Positioned within the channel 112 is a filler member 113 which overlies the flexible member 110 and is preferably cemented both to the member 110 and to the frame 111 at the base of the channel 112. The filler member 113 outlines a well 114 for the reception of a sheet 115 of X-ray sensitive material and one or more intensifying screens, such as the intensifying screen 116 shown.

A rigid support member 117 is removably lodged within the well 114 in sealing engagement with the filler member 113 and to this end is provided with a flexible sealing strip 118 of soft rubber, leather, or other suitable material lodged in a marginal recess 119 extending continuously around the front face of the support member. The sealing strip 118 extends outwardly from the support member 117 a distance sufficient for it to lie substantially snugly against the compartment face of the filler member when the support member is in position within the well 114.

The support member 117 may be bodily removable from the well 114 but as here preferably embodied is hinged along one edge to the frame 111 by means of hinges 120 so that it may be swung out for insertion and removal of the sensitive material and intensifying screens.

Means are provided for releasably locking the support member in its closed position. As here preferably embodied, resilient latch members 121 in suitable number, are positioned on the support member, preferably at equally spaced intervals and are pivotally secured midway of their ends to the support member as by means of screws 122. The latch members are suitably curved upwardly from the support member and at their ends are lodged within the channel 112 in firm engagement with the frame 111. The number of latch members required and the magnitude of the pressure each is to exert against the support member will depend upon the size of the cassette. As a measure of these requirements, however, suitable results have been obtained when employing 14" x 17" sheets of sensitive material, through the provision of three latch members exerting a pressure of approximately 7 pounds per square inch at each of the six points of engagement with the frame 111.

In order to apply suction to the space between the support member 117 and the flexible window member 110, a passage 123 is provided between the well 114 and the outside of the cassette, the passage extending through the filler member 113 and the frame 111. A tube 124 which may be tapered, is lodged, preferably removably, within the passage and may be connected, as by means of a rubber hose (not shown), to a suitable suction device (not shown).

Thus, it will be apparent that upon the application of suction through the tube 124, the flexible member 110 will be forcibly and evenly pressed toward the support member 117 so as to press the sensitive material 115 into intimate contact with the intensifying screen 116 over the entire area.

This application is a continuation-in-part of my application No. 428,994, now Patent 2,321,156, granted June 8, 1943.

The invention in its broader aspects is not limited to the specific mechanisms shown and described but departures may be made therefrom within the scope of the accompanying claims without departing from the principles of the invention and without sacrificing its chief advantages.

What is claimed is:

1. A portable X-ray cassette including in combination a pair of sheets of light opaque material one of which is transparent to X-radiation, means for holding said sheets in coextensive relation to receive sensitive material and an intensifying screen between them, and an air duct connected with the space between the sheets for removing the air from between the sheets.

2. An X-ray cassette including in combination a flexible sheet of light-opaque material transparent to X-radiation, a backing coextensive with the sheet and to which it is attached to receive sensitive material and an intensifying screen between the sheet and backing, means for initially sealing the edges of the sheet to the backing, and an air duct connected to the space between the sheet and backing and suction means for applying suction to the space to press the sheet towards its backing and to bring the sensitive material and intensifying screen into intimate contact.

3. An X-ray cassette including in combination a pair of sheets of light opaque material, one of which is transparent to X-radiation, means for sealing said sheets along their edges and for holding the sheets in assembled relation, at least one edge being separable for introducing a sheet of sensitive material and an intensifying screen between them, and an air duct connected with the space between the sheets for applying suction to said space to press the sheets, the sensitive material and the intensifying screen together.

4. An X-ray cassette including in combination a pair of flexible sheets of light opaque material, one of which is transparent to X-radiation, means for sealing said sheets along their edges and for holding the sheets in assembled relation, at least one edge being separable for introducing a sheet of sensitive material and in intensifying screen between them, said sealing means comprising a strip surrounding the sheets, and extending between their margins and formed with a continuous duct communicating with an exhaust tube and provided with apertures leading from the duct to the space between the sheets.

5. A portable X-ray cassette including in combination a pair of wall members of light opaque material one of which is transparent to X-radiation, sealing means connecting said members along their marginal portions and separably along at least one of said portions so as to provide an air-tight suction chamber therebetween to receive sensitive material and an intensifying screen, and a suction duct communicating with said chamber.

6. A portable X-ray cassette including in combination a pair of wall members of light opaque material at least one of which is flexible and transparent to X-radiation, sealing means connecting said members along their marginal portions and separably along at least one of said portions so as to provide an air-tight suction chamber therebetween to receive sensitive material and an intensifying screen, and a suction duct communicating with said chamber.

7. A portable X-ray cassette including in combination a pair of wall members of light opaque material at least one of which is flexible and transparent to X-radiation, flexible sealing means connecting said members along their marginal portions and separably along at least one of said portions so as to provide an air-tight suction chamber therebetween to receive sensitive material and an intensifying screen, and a suction duct communicating with said chamber.

8. A portable X-ray cassette including in combination a pair of wall members of light opaque material at least one of which is flexible and transparent to X-radiation, sealing means connecting said members along their marginal portions so as to provide an air-tight suction chamber therebetween to receive sensitive material and an intensifying screen, said sealing means comprising a flexible member separably connecting said members along at least one of said portions, and a suction duct communicating with said chamber.

9. A portable X-ray cassette including in combination a flexible member and a rigid support member of light opaque material, said flexible member being transparent to X-radiation, sealing means separably connecting said members along their marginal edges so as to provide a suction chamber therebetween adapted to receive sensitive material and an intensifying screen, and a suction duct communicating with said chamber.

10. A portable X-ray cassette including in combination a flexible member and a rigid support member, said flexible member being transparent to X-radiation, sealing means separably connecting said members along their marginal edges so as to provide a suction chamber therebetween to receive sensitive material and an intensifying screen, said sealing means comprising a rigid frame marginally masking said flexible member, a rigid strip member overlying the marginally masked portion of said flexible member and a flexible sealing strip carried by said rigid support member and slidably engaging said strip member, and a suction duct communicating with said chamber.

11. A portable X-ray cassette including in combination a flexible member which is opaque to light and transparent to X-radiation, means forming a well with said flexible member to contain sensitive material and an intensifying screen, a rigid support member removably positioned in said well, means sealing the space between said support member and said well forming means so as to form an air-tight suction chamber, means for releasably securing said rigid support member in said well, and an air eduction passage leading from said chamber.

12. A portable X-ray cassette in accordance with claim 11, said sealing means being anchored to said rigid support member.

13. A portable X-ray cassette in accordance with claim 11, said rigid support member being hinged to said well-forming means.

14. A portable X-ray cassette in accordance with claim 11, said securing means comprising resilient latch members carried by said rigid support member for releasable engagement with said well-forming means.

15. A portable X-ray cassette including, in combination, a flexible member which is opaque to light and transparent to X-radiation, said member being provided with a continuous outstanding rigid margin having an air duct, support members removably positioned within the confines of said margin, means for sealing the space between said support members and said margin so as to form an air-tight suction chamber between said flexible member and said support members, and an air eduction tube leading from said chamber.

FRANK T. POWERS.